US010836882B2

United States Patent
McAdams

(10) Patent No.: US 10,836,882 B2
(45) Date of Patent: Nov. 17, 2020

(54) POLYURETHANE AND POLYISOCYANURATE FOAMS AND METHODS OF PRODUCING THE SAME

(71) Applicant: INVISTA NORTH AMERICA S.A.R.L., Wilmington, DE (US)

(72) Inventor: Carina A. McAdams, Wilmington, NC (US)

(73) Assignee: INVISTA North America S.a.r.l., Wilmington, DE (US)

( * ) Notice: Subject to any disclaimer, the term of this patent is extended or adjusted under 35 U.S.C. 154(b) by 113 days.

(21) Appl. No.: 16/077,108

(22) PCT Filed: Mar. 7, 2017

(86) PCT No.: PCT/US2017/021173
§ 371 (c)(1),
(2) Date: Aug. 10, 2018

(87) PCT Pub. No.: WO2017/156010
PCT Pub. Date: Sep. 14, 2017

(65) Prior Publication Data
US 2019/0048163 A1    Feb. 14, 2019

Related U.S. Application Data

(60) Provisional application No. 62/306,698, filed on Mar. 11, 2016.

(51) Int. Cl.
| | |
|---|---|
| C08G 18/22 | (2006.01) |
| C08G 18/42 | (2006.01) |
| C08G 18/48 | (2006.01) |
| C08J 9/00 | (2006.01) |
| C08J 9/14 | (2006.01) |
| C08K 3/016 | (2018.01) |
| C08G 101/00 | (2006.01) |

(52) U.S. Cl.
CPC ............ *C08J 9/141* (2013.01); *C08G 18/225* (2013.01); *C08G 18/4211* (2013.01); *C08G 18/4244* (2013.01); *C08G 18/4837* (2013.01); *C08J 9/0061* (2013.01); *C08K 3/016* (2018.01); *C08G 2101/00* (2013.01); *C08J 2201/022* (2013.01); *C08J 2203/14* (2013.01); *C08J 2203/182* (2013.01); *C08J 2205/052* (2013.01); *C08J 2205/10* (2013.01); *C08J 2375/04* (2013.01); *C08J 2375/06* (2013.01); *C08J 2483/12* (2013.01)

(58) Field of Classification Search
CPC .... C08G 63/66; C08G 63/664; C08G 63/668; C08J 9/141; C08J 2201/022; C08J 2483/12

See application file for complete search history.

(56) References Cited

U.S. PATENT DOCUMENTS

| | | | | |
|---|---|---|---|---|
| 3,849,515 | A * | 11/1974 | Muller | C08G 18/4244 528/274 |
| 3,933,698 | A | 1/1976 | Fuzesi et al. | |
| 4,071,482 | A | 1/1978 | Hopkins, Jr. et al. | |
| 4,605,729 | A * | 8/1986 | Barnes | C08G 18/4244 528/272 |
| 4,608,432 | A | 8/1986 | Magnus et al. | |
| 4,644,027 | A | 2/1987 | Magnus et al. | |
| 4,644,047 | A | 2/1987 | Wood | |
| 4,644,048 | A | 2/1987 | Magnus et al. | |
| 5,145,883 | A * | 9/1992 | Saito | C08G 18/4252 428/317.9 |
| 6,753,402 | B1 * | 6/2004 | Bauer | C08G 18/4018 252/182.27 |
| 8,680,211 | B2 * | 3/2014 | Shutov | C08G 18/4261 525/408 |
| 2009/0054542 | A1 * | 2/2009 | Schoenberger | A61L 15/26 521/137 |
| 2010/0249287 | A1 * | 9/2010 | Schmidt | C08K 5/0066 524/101 |
| 2011/0230581 | A1 * | 9/2011 | Klescewski | C08G 65/2663 521/174 |

FOREIGN PATENT DOCUMENTS

| | | |
|---|---|---|
| EP | 2565226 A1 | 3/2013 |
| WO | 2017/156010 A1 | 9/2017 |

OTHER PUBLICATIONS

International Search Report and Written opinion received for PCT Application No. PCT/US2017/021173, dated Jun. 17, 2017, 8 pages.

\* cited by examiner

*Primary Examiner* — Melissa A Rioja
(74) *Attorney, Agent, or Firm* — Invista North America S.A.R.L.

(57) ABSTRACT

The present disclosure relates to a modified polyester polyol composition useful in the formulation of polyurethane and polyisocyanurate cellular polymers for use in making foam articles with hydrocarbon blowing agents. The modified polyester polyol composition comprises the reaction product of a polyol with an EO/PO block copolymer having a weight average molecular weight from 1,000 to 20,000 g/mol and has a viscosity in the range of 100 to 10,000 centipoise, as determined at 25° C. according to the ASTM D-4878 method.

9 Claims, No Drawings

POLYURETHANE AND POLYISOCYANURATE FOAMS AND METHODS OF PRODUCING THE SAME

FIELD

The present disclosure relates to polyurethane and polyisocyanurate cellular foams and methods of producing the same.

BACKGROUND

Polyurethane (PUR) and polyisocyanurate (PIR) cellular foams have been among the most widely used and versatile insulating materials in many applications. These find use in applications such as, insulation of cooling and heating appliances, pour-in-place door panels, construction insulation, lamination of insulation panels, spray foam insulation, structural foams for housing, wood lamination, packaging, etc.

Aromatic polyester polyols (herein referred to as APPs) have been used in the PUR/PIR industry for the past four decades and play a role in various PUR/PIR rigid foam applications, including PUR spray foam systems. Industrial uses of APPs include manufacture of PUR and/or PIR polymer products. The PUR and PIR polymers are polyfunctional and can be used as adhesives, binders (e.g., for wood fibers), coatings, and foams. The known benefits include low-cost, rigid cellular structure and excellent properties that are desired for many end-use applications.

Polyurethane (PUR) derived foams have historically used APPs as a way to improve physical and other properties. Cost advantages by incorporating APPs are also realized due to a decrease in more expensive raw material usage and other petroleum based polyols.

U.S. Pat. No. 4,608,432 relates to a process for preparing a low acid number self-compatibilizing polyester polyol product blend based on polyalkylene terephthalate.

U.S. Pat. No. 4,644,027 relates to phthalate polyester polyols comprising reaction products of a phthalic acid compound, a low molecular weight diol compound and a hydrophobic compound, which are compatibilized with fluorocarbon blowing agents.

U.S. Pat. Nos. 4,644,047 and 4,644,048 relate to phthalate polyester polyols comprising reaction products of a phthalic acid compound, a low molecular weight diol compound and a nonionic surfactant compound are provided which are compatibilized with fluorocarbon blowing agents.

In rigid foam insulation industry that uses PIR/PUR foams, manufacture of rigid foams with fine cellular structure is desirable to give improved insulation properties (i.e., improved R-value). In reacting the A-side component (organic isocyanates) with the B-side component (polyol emulsion) in the presence of a blowing agent, a good balance of foaming versus unique cellular structures with well-formed cell boundaries is required. Proper choice of surfactant during the reactive AB step is needed to develop acceptable cell structure and reduced defects. However, problems still exist in this step with elongated cells and collapsed cellular structures, which can adversely affect the structural, mechanical strength and insulation properties of the final foam structure especially in systems using hydrocarbon blowing agents.

Suitable hydrocarbon blowing agents include $C_5$ hydrocarbons such as n-pentane, iso-pentane, cyclopentane, and blends thereof. During the foam blowing process involving isocyanates (A-side component) and polyols emulsion (B-side component), hydrocarbons as blowing agents must sufficiently homogenize and compatibilize in the reactive AB emulsion matrix. This is important in order to uniformly disperse the blowing agent such that a stable, well-formed cellular substance with round cell structures can be formed. Such fine well rounded cellular structures will have desirable foam properties such as dimensional stability, mechanical strength, processing ease and insulation performance.

Therefore, there is an industrial need to devise alternatives wherein the hydrocarbon blowing agent can be sufficiently stabilized in the reactive AB emulsion matrix. The present disclosure addresses this unmet need via a modified polyols emulsion comprising APPs as the B-side component that can sufficiently homogenize the $C_5$ hydrocarbon blowing agent during the foam blowing process. The advantages of providing such improved emulsion matrix for the PUR/PIR foam industry are seen in the improved foam properties and performance as described in the present disclosure.

SUMMARY

In accordance with the present disclosure, the need for polyols (B-side component) with good interaction and compatibility with the blowing agent in the PIR/PUR manufacturing process is addressed by pre-reacting the polyol with a specific EO/PO block copolymer to produce a modified polyester polyol emulsion matrix, which provides a stabilized B-side or foam precursor in the presence of the blowing agent and subsequently forms a stable isocyanate-polyol reaction during the foaming reaction. It is observed that the processing ease, dimensional stability, mechanical strength and insulation properties of the final foam products are significantly improved.

Thus, in one aspect, the present disclosure provides a foam formed by:

(a) reacting a polyol with an EO/PO block copolymer having a weight average molecular weight from 1,000 to 20,000 g/mol to form a homogeneous foam precursor composition having a viscosity in the range of 100 to 10,000 centipoise, for example, 1,000 to 6,000 centipoise, as determined at 25° C. according to the ASTM D-4878 method; and (b) contacting the homogeneous foam precursor of (a) with isocyanate and a halogen-free blowing agent.

In a further aspect, the present disclosure provides a homogeneous foam precursor comprising the reaction product of a polyester polyol and an EO/PO block copolymer, wherein the EO/PO block copolymer has a weight average molecular weight from ≥1,000 to ≤20,000 g/mol and the homogeneous foam precursor has a viscosity in the range of 2100 to ≤10,000 centipoise, as determined at 25° C. according to the ASTM D-4878 method.

In yet a further aspect, the present disclosure provides a method for making foam comprising:

(a) reacting a polyester polyol with an EO/PO block copolymer, wherein the EO/PO block copolymer has a weight average molecular weight from ≥1,000 to ≤20,000 g/mol to form a homogeneous foam precursor having a viscosity in the range of ≥100 to ≤10,000 centipoise, as determined at 25° C. according to the ASTM D-4878; and (b) contacting the homogeneous foam precursor of (a) with isocyanate and non-halogenated blowing agent under foam-forming conditions.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure is defined only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the suitable methods and materials are now described.

All percent compositions are given as weight-percentages or wt. %, unless otherwise stated. When solutions or mixtures of components are referred to, percentages refer to weight-percentages of the component relative to the total composition unless otherwise indicated.

All average molecular weights of polymers are weight-average molecular weights, unless otherwise specified.

The term "hydroxyl value" (abbreviated as HV) or "hydroxyl number" (abbreviated as HN) indicates the total amount of residual hydroxyl (—OH) groups present in the material. The HV or HN is reported as mg KOH/gm (i.e., milligrams of KOH per gram of sample) and is measured according to well-known methods such as standard ASTM D-1957, ASTM E-1899 or ASTM D-4274.

The term "average functionality", or "average hydroxyl functionality" of a polyol indicates the number of —OH groups per molecule, on average. The average functionality of an isocyanate refers to the number of —NCO groups per molecule, on average.

The term "acid value" (abbreviated as AV) or "acid number" (abbreviated as AN) indicates the concentration of carboxylic acid groups present in the material. The AV or AN is reported in terms of mg KOH/gm (i.e., milligrams of KOH per gram of sample) and is measured according to well-known methods such as standard ASTM D-4662 or ASTM D-1613.

The term "foam" is used to refer to a cellular structure produced by an expansion process, known as "foaming", and also having a comparatively low weight per unit volume (or density) and with low thermal conductivity. The cellular structure is made up of well-defined cell boundaries, wherein a low density component (such as gas) is dispersed and confined within the cells distributed across a continuous phase (liquid or solid). Cellular foams can be light-weight or heavy, porous or dense, semi-rigid or rigid, or flexible spongy materials depending on the end-use application. Rigid foams are usually the solidified form of a continuous liquid matrix full of gas-filled cells or bubbles dispersed within the matrix. Rigid foams are often used as insulators for noise abatement, shock absorption and/or as heat insulators in construction, in cooling and heating technology (e.g., household appliances), for producing composite materials (e.g., sandwich elements for roofing and siding), and for wood simulation material, model-making material, and packaging.

Pressures reported as pounds per square inch gauge (Psig) are relative to one atmosphere. One pound per square inch equals 6.895 kilopascals (kPa). One atmosphere is equivalent to 101.325 kPa or about 14.7 pounds per square inch absolute (Psia) or about zero Psig.

Disclosed herein is a foam precursor composition comprising a modified polyol emulsion useful as the B-side component in the production of polyurethane and polyisocyanurate cellular polymers by reaction (the AB reaction) with the A-side component (organic isocyanate) in the presence of a blowing agent. The present modified polyol emulsion exhibits improved compatibility with blowing agents, particularly hydrocarbon blowing agents, and, in some embodiments, may make it possible to either minimize or even eliminate the surfactant that is otherwise introduced during the reactive AB step, further simplifying the process.

The foam precursor composition described herein comprises the reaction product of a polyol and an ethylene oxide/propylene oxide (EO/PO) block copolymer having a weight average molecular weight of from 1,000 to 20,000 g/mol, for example from 2,000 to 20,000 g/mol, preferably from 10,000 to 14,000 g/mol. The reaction between the polyol and the EO/PO block copolymer can optionally be carried out in the presence of a trans-/esterification catalyst.

Any polyol can be reacted with the EO/PO copolymer to produce the desired foam precursor composition, but in some embodiments the polyol can be a polyester polyol, for example, an aromatic polyester polyol. Suitable aromatic polyester polyols comprise the reaction products of phthalic anhydride and/or terephthalic acid with one or more aliphatic diols, such as diethylene glycol.

The foam precursor composition may have emulsion viscosity of 100 to 10,000 cps, for example from 500 to 6000 cps, such as from 1000 to 5000 cps, and preferably from 1200 to 4000 cps as measured at 25° C. according to the ASTM D-4878 method.

Other components can be added to obtain favorable properties during the preparation of the compositions according to the present disclosure. For example, a polyol composition with favorable properties for preparation of PUR/PIR polymers may have relatively low free carboxylic acid content (or acid value). More specifically, a polyol emulsion composition suitable for preparation of a PUR/PIR polymer may have a hydroxyl value of about 100 to 500 mg KOH/g sample, or may have an acid value of less than 1 mg KOH/g sample, or less than 5 mg KOH/g sample, or preferably less than 3 mg KOH/g sample; or any combination thereof.

The precursor compositions prepared by the disclosed method can further include one or more other components known to those skilled in the art and dependent on end use. Such components may include other polyols, solvents, catalysts, chain extenders, cross-linkers, curing agents, surfactants, blowing agents, fillers, flame retardants, plasticizers, light stabilizers, colorants, waxes, biocides, minerals, micronutrients, inhibitors, stabilizers or other organic or inorganic additives.

The precursor compositions prepared by the disclosed method can be used in formation of a resin blend, suitable as a "B-side component" of a pre-polymer composition. The resin blend may comprise the modified polyester polyol emulsion of the present disclosure and may further include other polyols, solvents, catalysts, chain extenders, cross-linkers, curing agents, surfactants, blowing agents, fillers, flame retardants, plasticizers, light stabilizers, colorants, waxes, biocides, minerals, micronutrients, inhibitors, stabilizers or other organic or inorganic additives.

Emulsion compositions prepared by the disclosed method may include hydrophilic materials selected from the group of polyethylene glycols (PEGs). For example, the PEGs can have a molecular weight of about 200 to 2000 or about 200 to 1000 or about 400 to 1000.

The disclosed resin blend can be reacted with a polyfunctional isocyanate ("A-side component"), such as methylene diphenyl diisocyanate (MDI) or a polymeric MDI (PMDI), to provide a polymer composition of the present disclosure.

Reaction of the A-side and B-side components may provide new PUR and/or PIR polymers depending upon the specific conditions implemented.

Non-limiting examples of the A-side component can be Mondur® MR Lite from Bayer Corporation and Rubinate® M from Huntsman Corporation. However, it is not intended the A-side component be limited to those specifically illustrated herein. For example, the A-side component of the formulations of the present disclosure can be selected from organic polyisocyanates, modified polyisocyanates, isocyanate-based prepolymers, and mixtures thereof. Such choices can also include aliphatic and cycloaliphatic isocyanates, but aromatic and especially multifunctional aromatic isocyanates are particularly useful.

The B-side component can be a resin blend containing one or more Mannich polyols, one or more polyester polyols, and one or more polyether polyols (as well as polyols of the present disclosure). Additionally, the B-side component can contain catalysts, surfactants, flame retardants, and/or blowing agents. An example of Mannich polyol is Jeffol® R-425X available from Huntsman Corp. Non-limiting examples of aromatic polyester polyols are Terate® HT 5500, Terate® HT 5510, Terate® HT 2000, etc. polyols, that are commercially available from INVISTA S.à r. l. An example of polyether polyol is Voranol™ 360 from Dow Corp.

To make a foam, the precursor emulsion composition can be reacted with an organic isocyanate in the presence of a halogen-free, non-nonyl phenol blowing agent at conditions sufficient to develop a cellular matrix substance having a weight per unit volume of at least 1.5 lb/ft$^3$ and an insulation R-value of greater than 6. Suitable foam compositions comprise the reaction product of a mixture comprising:
  a) from 10 to 50 wt. % of the precursor composition;
  b) from 30 to 80 wt. % organic isocyanate;
  c) from 0 to 10 wt. % of hydroxylated component other than aromatic polyester polyol;
  d) from 0 to 5 wt. % of a catalyst;
  e) from 1 to 20 wt. % of a hydrocarbon as blowing agent; and
  f) from 0 to 5 wt. % of a surfactant.

The PUR/PIR foam can be produced at various volume ratios of precursor composition and polyisocyanate to obtain a certain Isocyanate Index. The ratios are normally referred to as A:B where "A" (or A-side component) is the polyisocyanate and "B" (or B-side component) is the resin blend. In an embodiment, the ratio can be about 1:1 to 3:1.

The use of PUR and/or PIR polymers of the present disclosure may include various amines and polyamines as chain extenders, cross-linkers, curing agents in coatings application. In other embodiments, the PUR and/or PIR polymers of the present disclosure may be used for fiber-reinforced compositions, such as a wood fiber reinforced composite. In some other embodiments, the use of PUR and/or PIR polymers of the present disclosure may provide a foam composition, comprising a pre-polymer composition according to the present disclosure with a suitable blowing agent. The foam composition can be spray foam.

The isocyanate can include any isocyanate with an average functionality of at least 2 that can be used to make a suitable polyurethane (PUR) and/or polyisocyanurate (PIR) foam.

Polyurethane (PUR) and/or polyisocyanurate (PIR) polymers are useful in accordance with the disclosed process. The PUR and/or PIR polymer can include a polyester polyol composition and a resin blend composition containing a polyester polyol composition according to the present disclosure, a catalyst, a surfactant, and a blowing agent. The polyester polyol composition can include any of the polyol compositions described herein. In addition, the catalyst, the surfactant, and the blowing agent can be any of the catalyst, the surfactant, and the blowing agent described herein. In an embodiment the polyol composition can be present in an amount so that the foam produced from the PUR and/or PIR polymer has a bio-based content of up to 20% by weight of the total organic carbon in the foam, or up to 15% by weight of the total organic carbon in the foam.

In the case of foam applications, the PUR/PIR polymers, obtained using the resin blends of the present disclosure, may be foamed by use of a blowing agent. Blowing agent is a volatile material that liquefies and expands within the solidifying polymer composition, producing bubbles in the material, that are then present in the final foam structure containing the solid polymer reaction product. Foams can be adherent as well, depending on the nature of the object they contact, and can be used as insulation, packing, and the like. Or, the foam can be set up without adherence, producing solid foam blocks, sheets, packing peanuts, and the like.

The blowing agent can be a hydrocarbon having 3 to 7 carbon atoms, water, carbon dioxide, and a mixture thereof. The hydrocarbon can include butane, n-pentane, i-pentane, cyclopentane, hexane, cyclohexane, each of their alkene analogues, and a combination thereof. In some embodiments, the blowing agent is about 1 to 20% by weight or preferably between 12 to 15% by weight, of the resin blend composition.

The disclosed process, emulsions and foams include the use of an aromatic polyester polyol composition in a polyol emulsion composition for PUR/PIR polymer. Embodiments of this disclosure relate to the manufacturing of PUR/PIR derived foams using hydrocarbon based blowing agents as described above with or without water at a high index. The foam formed has suitable physical and insulation characteristics (e.g., having an R value of greater than 6 and parallel compressive strength greater than 20 psig at a weight per unit volume, or density, of less than 1.6 lb/ft) as well as having low surface friability according to the friability test method described elsewhere herein.

The emulsion compositions of the present disclosure may be prepared by methods known to the skilled person. For example, compositions containing the resin blend can be added to a blend tank and mixed under ambient conditions and, if the blend tank is pressure rated the blowing agent may be added last and all the compositions mixed for a period of time until a homogenous mixture is produced.

In some embodiments, the emulsion composition containing an aromatic polyester polyol, a catalyst, a surfactant, and blowing agent can be used to produce PUR/PIR foams with an NCO index ranging from about 110 to 450. In some embodiments, the polyol emulsion composition can have an average functionality of at least about 1.5 and an overall hydroxyl value of at least about 120.

The following Examples demonstrate the present disclosure and its capability for use. The disclosure is capable of other and different embodiments, and its several details are capable of modifications in various apparent respects, without departing from the spirit and scope of the present disclosure. Accordingly, the Examples are to be regarded as illustrative in nature and non-limiting.

EXAMPLES

Materials Used in the Examples

The term "Terate® HT-2000", as used herein, refers to an aromatic polyester polyol that is manufactured by INVISTA and commercially available under the brand name INVISTA Terate® HT 2000 polyol.

The term "Terate® HT-5500", as used herein, refers to an aromatic polyester polyol that is manufactured by INVISTA and commercially available under the brand name INVISTA Terate® HT 5500 polyol.

The term "Terate® HT-5510", as used herein, refers to an aromatic polyester polyol that is manufactured by INVISTA and commercially available under the brand name INVISTA Terate® HT 5510 polyol.

The term "TCPP", as used herein, refers to tris(2-chloro-1-methylethyl) phosphate. The 95% (min.) concentration TCPP is available from Sigma-Aldrich, ICL Supresta, Albemarle, Shekoy, Cellchem and other commercial suppliers.

The term "PEG-600", as used herein, refers to polyethylene glycol (CAS No. 25322-68-3) having the average molecular weight in the 570-630 range. The PEG-600 glycol is available from Fisher Scientific, BASF, Lambert Technologies, Dow, Brenntag, Polioles and other commercial suppliers. Another example of suitable polyethylene glycol is PEG-400 having the average molecular weight in the 400 range.

Commercially available phthalic acid, terephthalic acid (PTA) and diethylene glycol (DEG) materials are used in the examples of the present disclosure. Industrially known and available modifiers such as aliphatic acids and/or natural oils are used in the examples of the present disclosure.

As used herein, Polycat® 46 and Dabco® K-15 are a class of isocyanate trimerization catalysts that are known industrially. These are alkali metal carboxylate salts such as potassium acetate, potassium octoate.

As used herein, Polycat® 5 is a co-catalyst that is known to catalyze the reaction of water with isocyanate.

As used herein, the TEGOSTAB® B series silicone surfactants for closed-cell foams commercially available from Evonik Industries.

The term "EO/PO block copolymer", as used herein, refers to a class of non-ionic, low-foaming surfactants of ethylene oxide (EO) and propylene oxide (PO). These are generally described as having a general chemical structure of the form $(PEO)_a$-$(PPO)_b$-$(PEO)_c$ or $(PPO)_x$-$(PEO)_y$-$(PPO)_z$, wherein "PEO" and "PPO" refer to poly(ethylene oxide) and poly(propylene oxide), respectively, and the subscripts "a", "b", "c", "x", "y" and "z" are the monomer repeat units that are polymerized; monomers being EO and PO. Non-limiting examples of such EO/PO block copolymers are described and accessible on the website www.ineos.com.

Test Methods Used in the Examples

The acid number (AN) or acid value (AV) determination is performed according to the ASTM D-4662 method. The acid number unit of measurement is mg KOH/g of sample.

The hydroxyl number (HN) or hydroxyl value (HV) determination is performed according to the ASTM D-4274 method. The hydroxyl number unit of measurement is mg KOH/g of sample.

The water content in the sample is determined according to the ASTM D-4672 method. The water content is measured as wt. % relative to the total sample weight.

The sample viscosity at 25° C. is determined according to the ASTM D-4878 method. The viscosity is measured in the units of centipoise (cps).

Friability Test—As described in U.S. Pat. Nos. 3,933,698 and 4,071,482; the disclosures of each herein incorporated by reference in their entirety, a surface friability test is conducted using the finger test method. Foam is produced in a single cup by machine mixing both "A-side" and "B-side" components together. As the chemicals react the foam produced rises above the rim of the cup. The top portion of the foam is called the crown. At different time intervals, a fingernail is rubbed across the crown with slight downward pressure. The surface friability is observed as being High, Moderate or Low. A High rating indicates considerable surface crumbling, a Moderate rating indicates slight surface crumbling and a Low rating indicates no surface crumbling.

Foam properties are measured according to various standard test methods. K-factor is measured according to ASTM C518-04 Standard Test Method for Steady State Thermal Transmission Properties by Means of the Heat Flow Meter Apparatus. Closed cell content is determined as 100% minus open cell content, which is measured according to ASTM D6226-05 Standard Test Method for Open Cell Content of Rigid Cellular Plastics. Humid age dimensional stability is measured according to ASTM D2126-04 Standard Test Method for Response of Rigid Cellular Plastics to Thermal and Humid Aging. Foam density is measured according to ASTM D1622-93 Standard Test Method for Apparent Density of Rigid Cellular Plastics. Compressive strength is measured according to ASTM D1621-94 Standard Test Method for Compressive Properties of Rigid Cellular Plastics. ASTM standard methods are from ASTM International, West Conshohocken, Pa., USA, www.astm.org.

The following terms are used in accordance with ASTM D7487-13 "Standard Practice for Polyurethane Raw Materials: Polyurethane Foam Cup Test.

"Cream Time" or "CT" is the time when bubbles start to make the level of liquid to rise.

"Gel Time" or "GT" is the time when strings can no longer be pulled during the foaming reaction.

"Tack Free Time" or "TFT" is the time when the foam is no longer tacky or sticky.

The term "End of Rise" or "E.R.", as used herein, is the time when the foam stops rising during the foaming process.

The term "Isocyanate Index", as used herein, is the ratio of amount of isocyanate used to theoretical amount of isocyanate needed to react all available OH groups in a formulation.

The term "K-Factor", as used herein, is a measure of heat in British-thermal-units (BTUs) that passes through a 1-inch thick, 1-$ft^2$ of foam surface area in 1 hour, for each degree Fahrenheit (or ° F.) temperature interval.

The term "R-Value", as used herein, is the inverse of the K-factor and is a measure of thermal resistance for a particular material such as rigid foam.

Foams, according to the present disclosure, are generated via hand-mix preparations. Various foams are also generated from pilot laminators. Foam performance is monitored using procedures set forth in standard methods, namely, ASTM D-1622 for density measurements, ASTM C-518 for initial and aged K-factor data, ASTM D-2126 for dimensional stability, and ASTM D-1621 for compressive strength.

The polyols are characterized for acidity, hydroxyl values, and viscosities at 25° C. The total acid number (AN) and hydroxyl values (OH) are determined by using the standard titration methods. Dynamic viscosity measurements are done at 25° C. on a Brookfield viscometer.

Example 1—Incorporation of EO/PO Block Copolymer During Aromatic Polyester Polyol Synthesis In a 3-liter reaction vessel equipped with an agitator, heat transfer jacket and inert atmosphere, about 542 g of phthalic anhydride, about 567 g of terephthalic acid (PTA), about 1320 g of diethylene glycol (DEG) and about 156 g of other modifiers including aliphatic acids and/or natural oils are reacted, optionally in the presence of an esterification catalyst such as tetra-butyl titanates or other organic titanates. The reaction conditions are 1 atm. pressure, about 200-240° C. temperature and under nitrogen sparging. The acid value of the reaction mixture is monitored by periodic sampling of the reaction mixture. About 38 g of EO/PO block copolymer [Average MW=10000-14000, % EO=50 to 80%] is gradually added when the acid value of the reaction mixture drops below 2. The reaction is completed and the product is recovered upon cooling. The product, aromatic polyester polyol, is analyzed to have 1.75 mg KOH/g acid value, 260 mg KOH/g hydroxyl value and viscosity of 4505 cps measured at 25° C.

Example 2—Reaction of EO/PO Block Copolymer with Aromatic Polyester Polyol

Using the 3-liter reaction vessel as described in Example 1, several commercially available aromatic polyester polyols are reacted with an EO/PO block copolymer as in Example 1. For each preparation, about 2948 g of aromatic polyester polyol is used to react with about 53 g of EO/PO block copolymer. The reaction conditions are 1 atm. pressure, about 190-235° C. temperature and about 2-3 hrs of reaction time.

Table I represents these preparations and the measured properties of the recovered polyol products.

TABLE I

| Product ID. | Polyol "A" | Polyol "B" | Polyol "C" |
|---|---|---|---|
| Commercial Polyol used | Terate ® HT 5500 polyol | Terate ® HT 2000 polyol | Terate ® HT 5510 polyol |
| Average Molecular Weight (by weight, grams) | 477.4 | 547.3 | 431.5 |
| Aromatic polyester polyol | 2947.5 | 2947.5 | 2947.5 |
| EO/PO Copolymer | 52.5 | 52.5 | 52.5 |
| EO/PO copolymer content (mole %) | 0.06 | 0.07 | 0.05 |
| Reaction Conditions | | | |
| Top temperature (Deg. C.) | 190-235 | 190-235 | 190-235 |
| Time at Top Temperature | 2 to 3 hours | 2 to 3 hours | 2 to 3 hours |
| Product Analysis | | | |
| Acid Value, mg KOH/g | <1 | 1.5 | 1.8 |
| Hydroxyl No, mg KOH/g | 235 | 210 | 260 |
| Viscosity @ 25° C., cps | 3000 | 6000 | 4500 |

Example 3—Incorporation of EO/PO Block Copolymer During Aromatic Polyester Polyol Synthesis Using the 3-liter reaction vessel and general procedure as described in Example 1, about 492 g of phthalic anhydride, about 567 g of terephthalic acid (PTA), about 1487 g of diethylene glycol (DEG) and about 359 g of other modifiers including aliphatic acids and/or natural oils are reacted, optionally in the presence of an esterification catalyst. The reaction conditions are 1 atm. pressure, about 200-240° C. temperature and under nitrogen sparging. The acid value of the reaction mixture is monitored by periodic sampling of the reaction mixture. About 30 g of EO/PO block copolymer [average MW=10,000-14,000, % EO=50 to 80%] is gradually added when the acid value of the reaction mixture drops below 1. The reaction is completed and the product is recovered upon cooling. Two batches are made using two different varieties of commercially available EO/PO block copolymer with an average MW in the 10,000-14,000 range.

Table II represents these preparations and the measured properties of the recovered polyol products.

TABLE II

| Product ID. | Polyol "D" | Polyol "E" |
|---|---|---|
| EO/PO Block Copolymer | 30 g of 14,000 MW | 30 g of 12,000 MW |
| Product Analysis | | |
| Acid Value, mg KOH/g | 0.9 | 0.9 |
| Hydroxyl No, mg KOH/g | 240 | 239 |
| Viscosity @ 25° C., cps | 3100 | 3050 |

Example 4(a-h)—Emulsion Preparations Using Polyol "A" of Example 2

Various foam precursor emulsion solutions are prepared according to the procedures described herein and using Polyol "A" of Example 2. Preparations include variations in the foam precursor components used, mainly, presence/absence of modifier, different $C_5$ hydrocarbons as blowing agents, types of surfactant and levels. Terate® HT-5500 polyol is used to develop side-by-side comparative data versus that using Polyol "A".

TABLE III (Examples 4a-h) below represents the emulsion viscosity, measured in cps at 25° C., of the prepared compatibilized B-side component.

TABLE III

| | No. | | | | | | | |
|---|---|---|---|---|---|---|---|---|
| | 4(a) | 4(b) | 4(c) | 4(d) | 4(e) | 4(f) | 4(g) | 4(h) |
| Polyol used | Terate ® HT 5500 | Polyol "A" | Terate ® HT 5500 | Polyol "A" | Terate ® HT 5500 | Polyol "A" | Terate ® HT 5500 | Polyol "A" |
| Modifier | — | — | — | — | Polyethylene Glycol (400-1000 MW) | | | |
| Blowing Agent | n-pentane | | 50/50 iso-/n-pentane | | 70/30 cyclo/iso-pentane | | | |
| Surfactant | TEGOSTAB ® B84504 | | TEGOSTAB ® B8489 | | TEGOSTAB ® B84504 | | | |

TABLE III-continued

| | 4(a) | 4(b) | 4(c) | 4(d) | 4(e) | 4(f) | 4(g) | 4(h) |
|---|---|---|---|---|---|---|---|---|
| Polyol | 33-34 | | 33-34 | | 33-34 | | 33-34 | |
| Flame Retardant | 4-4.5 | | 4-4.5 | | 4-4.5 | | 4-4.5 | |
| Catalysts | 1.5 | | 1.5 | | 1.4 | | 1.7 | |
| Surfactants | 0.65 | | 0.65 | | 0.93 | | 1.1 | |
| Water | 0.2 | | 0.2 | | 0.2 | | 0.14 | |
| Blowing Agent | 7-8 | | 7-8 | | 7-8 | | 7-8 | |

| Mixing Time | Emulsion Viscosity (cps) measured at 25° C. | | | | | | | |
|---|---|---|---|---|---|---|---|---|
| 20 sec | 2334 | 2642 | 2355 | 2805 | 328 | 2560 | 471 | 2621 |
| 45 sec | 2764 | 3584 | 2928 | 3481 | 533 | 3276 | 492 | 2969 |
| 90 sec | 2683 | 3707 | 2785 | 3809 | 594 | 3522 | 451 | 2867 |

Example 5(a-h)—Emulsion Preparations Using Polyol "B" of Example 2

Various foam precursor emulsion solutions are prepared according to the procedures described herein and using Polyol "B" of Example 2. Preparations include about 27-28 parts of polyol, 1-1.5 parts catalysts, about 2-2.5 parts flame retardant component (TCPP or like), about 1 part surfactant (e.g. TEGOSTAB® B8871 or like), about 0.2 part water and about 6-7 parts $C_5$ hydrocarbon blowing agent (varied). Teratea HT-2000 polyol is used to develop side-by-side comparative data versus that using Polyol "B".

TABLE IV (Examples 5a-h) below represents the emulsion viscosity, measured in cps at 25° C., of the prepared compatibilized B-side component

TABLE IV

| | 5(a) | 5(b) | 5(c) | 5(d) | 5(e) | 5(f) | 5(g) | 5(h) |
|---|---|---|---|---|---|---|---|---|
| Polyol used | Terate® HT 2000 | Polyol "B" | Terate® HT 2000 | Polyol "B" | Terate® HT 2000 | Polyol "B" | Terate® HT 2000 | Polyol "B" |
| Blowing Agent | 85/15 cyclo/iso-pentane | | iso-pentane | | n-pentane | | 75/25 iso-/n-pentane | |

| Mixing Time | Emulsion Viscosity (cps) measured at 25° C. | | | | | | | |
|---|---|---|---|---|---|---|---|---|
| 25 sec | 139 | 516 | 945 | 2138 | 271 | 1777 | 270 | 1826 |
| 50 sec | 180 | 1155 | 876 | 2113 | 401 | 1917 | 376 | 1777 |
| 100 sec | 172 | 1209 | 811 | 1851 | 352 | 1826 | 368 | 1900 |
| 150 sec | 229 | 1032 | 475 | 2162 | 253 | 1654 | 294 | 1794 |

Example 6(a-i)—Foam Precursor Emulsion Preparation Using Polyol "C" of Example 2

Polyol "C" of Example 2 is further utilized in the preparation of emulsion solutions as foam precursors using the procedure described in the above examples, except nine different commercially available surfactants are used. The component levels used in the preparation of each foam precursor emulsion are; about 90 parts polyol, about 14-16 parts flame retardant, about 3-5 parts catalyst, about 2-3 parts surfactant, about 0.5 parts water and about 23-25 parts $C_5$ hydrocarbon as blowing agent. Comparative data is also generated for Terate® HT-5510 polyol using similar preparations and component levels.

The foam precursor emulsion viscosity, measured in cps at 25° C., is represented in TABLE V (Examples 6a-i) below.

TABLE V

| No. | Terate® HT 5510 (comparative) | Polyol "C" |
|---|---|---|
| 6a | 2334 | 3256 |
| 6b | 1904 | 2560 |
| 6c | 2478 | 2539 |
| 6d | 1515 | 2969 |
| 6e | 880 | 3317 |
| 6f | 1802 | 2908 |
| 6g | 1986 | 3584 |

TABLE V-continued

| No. | Terate® HT 5510 (comparative) | Polyol "C" |
|---|---|---|
| 6h | 819 | 3502 |
| 6i | 1986 | 3584 |

Example 7(a-h)—Foam Preparation Using Polyol "A" of Example 2

In this illustrative example, an industrial method of "A-side" and "B-side" components reaction is employed to prepare several cellular foam specimens using the polyol resin blend "Polyol A" of Example 2 as the B-side component. N-pentane is used as blowing agent in these examples. Surfactants used are all commercially available materials.

Table VI (Examples 7a-h) below represents the ingredient amounts used for foam preparation and measured properties. The properties of the foam products prepared using polyol "A" of Example 2 are compared with those prepared using commercial Terate® HT 5500 polyol. It will be seen that the foam products prepared using polyol "A" exhibited longer gel and tack-free times and lower density than the products prepared using Terate® HT 5500 polyol.

TABLE VI

| | Surfactant | | | | | | | |
|---|---|---|---|---|---|---|---|---|
| | Pelsil 107 | | TEGOSTAB® B8511 | | Pelsil 107 | | TEGOSTAB® B8511 | |
| | Specimen ID | | | | | | | |
| | 7(a) | 7(b) | 7(c) | 7(d) | 7(e) | 7(f) | 7(g) | 7(h) |
| Polyol used | Terate® HT 5500 | Polyol "A" | Terate® HT 5500 | Polyol "A" | Terate® HT 5500 | Polyol "A" | Terate® HT 5500 | Polyol "A" |
| weight units | | | | | | | | |
| Polyol | 100.0 | 100.0 | 100.0 | 100.0 | 100.0 | 100.0 | 100.0 | 100.0 |
| TCPP | 12-13 | 12-13 | 12-13 | 12-13 | 12-13 | 12-13 | 12-13 | 12-13 |
| Polycat® 46 | 0.2-0.8 | 0.2-0.8 | 0.2-0.8 | 0.2-0.8 | 0.2-0.8 | 0.2-0.8 | 0.2-0.8 | 0.2-0.8 |
| Dabco® K-15 | 3-4 | 3-4 | 3-4 | 3-4 | 3-4 | 3-4 | 3-4 | 3-4 |
| Surfactant | 1.5-2 | 1.5-2 | 1.5-2 | 1.5-2 | 1.5-2 | 1.5-2 | 1.5-2 | 1.5-2 |
| Polycat® 5 | 0.1-0.6 | 0.1-0.6 | 0.1-0.6 | 0.1-0.6 | 0.1-0.6 | 0.1-0.6 | 0.1-0.6 | 0.1-0.6 |
| water | 0.25-0.7 | 0.25-0.7 | 0.25-0.7 | 0.25-0.7 | 0-0.25 | 0-0.25 | 0-0.25 | 0-0.25 |
| Blowing Agent | 22-24 | 22-24 | 22-24 | 22-24 | 25-27 | 25-27 | 25-27 | 25-27 |
| Isocyanate Index | 2.60 | | 2.60 | | 2.60 | | 2.60 | |
| Reactivity Profile | | | | | | | | |
| Cream Time, sec | 7 | 8 | 8 | 8 | 8 | 8 | 8 | 9 |
| Gel Time, sec | 19 | 22 | 22 | 22 | 18 | 20 | 19 | 22 |
| Tack Free Time, sec | 27 | 29 | 30 | 32 | 24 | 28 | 26 | 28 |
| E.R. | 30 | 31 | 30 | 30 | 32 | 31 | 29 | 34 |
| Density, lb/ft$^3$ | 1.62 | 1.52 | 1.62 | 1.61 | 1.58 | 1.52 | 1.65 | 1.50 |

Example 8(a-d)—Foam Preparation Using Polyol "D" and Polyol "E" of Example 3

In this illustrative example, an industrial method of A-side and B-side components reaction is employed to prepare several cellular foam specimens using the polyol resin blends, "Polyol D" and "Polyol E" of Example 3, as the B-side component. The $C_5$ hydrocarbons, namely, N-pentane and a 75:25 blend of iso-pentane: n-pentane are used as blowing agent in these examples. Surfactant used is a commercially available material under the trade name TEGOSTAB® B8871.

Table VII (Examples 8a-d) below represents the foam preparation compositions and measured properties. The properties of the foam products prepared using polyol "D" and polyol "E" of Example 3 are compared with those prepared using commercial Terate® HT 5500 polyol. It will be seen that the foam products prepared using polyols "D" and "E" exhibited lower K-Factor values, both initially and after 6 months aging, and higher compressive strength than the products prepared using Terate® HT 5500 polyol.

TABLE VII

| Specimen ID | 8(a) | 8(b) | 8(c) | 8(d) |
|---|---|---|---|---|
| Polyol used | Terate® HT 5500 | Polyol "D" | Terate® HT 5500 | Polyol "E" |
| Blowing Agent | n-Pentane | | 75/25 iso-/n-pentane | |
| weight units | | | | |
| Polyol | 100.0 | | 100.0 | |
| TCPP | 8-10 | | 8-10 | |
| Polycat® 46 | 0.2-0.8 | | 0.2-0.8 | |
| Dabco® K-15 | 4-5 | | 4-5 | |
| Surfactant | 1.5-2 | | 1.5-2 | |
| Polycat® 5 | 0.1-0.6 | | 0.1-0.6 | |
| water | 0.5-1 | | 0.5-1 | |
| Blowing Agent | 22-24 | | 22-24 | |
| Isocyanate Index | 3.0 | | 3.0 | |
| Reactivity Profile | | | | |
| Cream Time, sec | 14 | 15 | 12 | 12 |
| Gel Time, sec | 39 | 36 | 34 | 33 |
| Tack Free Time, sec | 52 | 56 | 50 | 56 |
| E.R. | 51 | 51 | 51 | 40 |
| (calc.) Density, lb/ft$^3$ | 1.84 | 1.84 | 1.84 | 1.84 |
| K-Factor | | | | |
| (Initial) | 0.156 | 0.152 | 0.158 | 0.153 |
| Six-month aged | 0.182 | 0.177 | 0.186 | 0.176 |
| Compressive Strength | | | | |
| Parallel | 46 | 47 | 46 | 56 |
| Perpendicular | 16 | 19 | 18 | 19 |

Example 9—Foam Preparation on a Minilaminator

In this illustrative example, an industrial method of "A-side" and "B-side" components reaction is employed to prepare several cellular foam specimens using the polyol resin blend "Polyol A" of Example 2 as the "B-side" component. A $C_5$ class of hydrocarbons is used as blowing agent. Surfactants used are all commercially available materials.

Six specimens are made and represented as "RUN 1" through "RUN 6" in Table VIII below.

TABLE VIII

| | Blowing Agent | | |
|---|---|---|---|
| | n-Pentane | 70:30 cyclopentane:iso-Pentane | iso-Pentane |
| | | Surfactant | |
| | V504 | TEGOSTAB ® B8871 | TEGOSTAB ® B84504 |
| | | Specimen ID | |
| | RUN 1 | RUN 2 | RUN 3 | RUN 4 | RUN 5 | RUN 6 |
| Polyol used | Terate ® HT 5500 | Polyol "A" | Terate ® HT 5500 | Polyol "A" | Terate ® HT 5500 | Polyol "A" |
| weight units | | | | | | |
| polyol | 100.0 | | 100.0 | | 100.0 | |
| TCPP | 8-11 | | 18-20 | | 18-20 | |
| Polycat ® 46 | 0.2-0.8 | | 0.0 | | 0.0 | |
| Dabco ® K-15 | 3-5 | | 3-5 | | 3-5 | |
| Surfactant | 1.5-3 | | 1.5-3 | | 1.5-3 | |
| Polycat ® 5 | 0.1-0.6 | | 0.1-0.6 | | 0.1-0.6 | |
| water | 0.5-1 | | 0.5-1 | | 0.5-1 | |
| Blowing Agent | 22-24 | | 22-24 | | 23-25 | |
| Isocyanate Index | 2.60 | | 3.00 | | 3.00 | |
| Target Core Density, lb/ft$^3$ | 1.70 | | 1.80 | | 1.70 | |
| Product Thickness, inches | 2.0 | | 3.0 | | 3.0 | |

Example 10—Foam Preparation Using 50:50 Iso:n-Pentane as Blowing Agent

The preparation methods of Example 9 are repeated except a 50:50 blend of iso:n-pentane is used as a blowing agent. When compared with the specimens prepared using Terate® HT 5502 polyol, the measured density of the specimens that used polyol "A" of Example 2 shows an averaged foam density reduction of greater than 0.05 lb/ft$^3$. The K-Factor value improvement is observed to be about 0.1 units for the specimens prepared with 50:50 iso:n-pentane as blowing agent, and about 0.15 units for those using 100% n-pentane as blowing agent.

Example 11—Foam Testing

The six foam specimens, as prepared in Example 9, are tested for their reactivity profiles, insulation properties and dimensional stability upon long-term exposure at various environmental conditions. The ambient relative humidity (RH) conditions are tested for seven day exposure at −40° C. and 93° C., along with 70° C. at about 100% RH.

Table IX below represents the data measured during this testing.

TABLE IX

| | | RUN 1 | RUN 2 | RUN 3 | RUN 4 | RUN 5 | RUN 6 |
|---|---|---|---|---|---|---|---|
| Reactivity Profile | | | | | | | |
| | Cream Time, sec | 5 | 5 | 6 | 6 | 7 | 6 |
| | Gel Time, sec | 13 | 14 | 16 | 17 | 18 | 18 |
| | Tack Free Time, sec | 19 | 20 | 27 | 28 | 30 | 30 |
| | Density, lb/ft$^3$ | 1.6 | 1.63 | 1.74 | 1.74 | 1.63 | 1.63 |
| | Core [24 hrs] Density, lb/ft$^3$ | 1.67 | 1.68 | 1.83 | 1.8 | 1.63 | 1.63 |
| K-Factor | Initial | 0.165 | 0.157 | 0.151 | 0.149 | 0.160 | 0.158 |
| | After 1 month | 0.166 | 0.164 | 0.159 | 0.158 | 0.169 | 0.166 |
| | After 3 months | 0.173 | 0.164 | 0.159 | 0.158 | 0.170 | 0.164 |
| Seven day exposure at 70° C. and 100% relative humidity (RH) | | | | | | | |
| % change in . . . | Length | 0.25 | 0.45 | 0.25 | 0.20 | 0.30 | 0.20 |
| | Width | 0.55 | 0.40 | 0.25 | 0.25 | 0.30 | 0.30 |
| | Thickness | 0.15 | 0.05 | 0.70 | 0.55 | 0.55 | 0.60 |
| | Volume | 1.0 | 0.9 | 1.15 | 1.0 | 1.15 | 1.15 |

TABLE IX-continued

|  |  | RUN 1 | RUN 2 | RUN 3 | RUN 4 | RUN 5 | RUN 6 |
|---|---|---|---|---|---|---|---|
| Seven day exposure at 93° C. and ambient relative humidity (RH) | | | | | | | |
| % change in . . . | Length | −0.15 | −0.20 | −0.20 | −0.20 | −0.20 | −0.30 |
|  | Width | −0.25 | −0.35 | −0.20 | −0.25 | −0.15 | −0.25 |
|  | Thickness | −0.15 | −0.55 | −0.35 | −0.45 | −0.20 | −0.10 |
|  | Volume | −0.5 | −1.1 | −0.75 | −0.95 | −0.6 | −0.65 |
| Seven day exposure at −40° C. and ambient relative humidity (RH) | | | | | | | |
| % change in . . . | Length | 0.0 | −0.1 | 0.0 | −0.05 | −0.05 | −0.05 |
|  | Width | −0.10 | −0.05 | 0.05 | −0.05 | 0.0 | −0.05 |
|  | Thickness | 0.25 | 0.05 | 0.05 | 0.0 | 0.10 | 0.15 |
|  | Volume | 0.15 | −1.0 | 0.10 | −0.1 | 0.0 | 0.0 |

Example 12(a-f)—Foam Testing

Several additional specimens, prepared according to the methods described above and with varying levels of water and/or blowing agent, are tested for reactivity, density and R-Value measures. Table X below represents a summary of test data. Polyol "A", as described in Example 2, is used, and a side-by-side comparative data is developed using Terate® HT 5500 polyol. It will be seen that the foam products prepared using polyol "A" exhibited higher R values, both initially and after heat-aging at 70° C. for six weeks, than the products prepared using Terate® HT 5500 polyol.

TABLE X

|  | 12(a) | 12(b) | 12(c) | 12(d) | 12(e) | 12(f) |
|---|---|---|---|---|---|---|
| Specimen made with . . . | Low water | | High water | | High blowing agent | |
| olyol used | Terate ® HT 5500 | Polyol "A" | Terate ® HT 5500 | Polyol "A" | Terate ® HT 5500 | Polyol "A" |
| Reactivity Profile | | | | | | |
| Cream Time, sec | 8 | 8 | 10 | 9 | 9 | 9 |
| Gel Time, sec | 25 | 23 | 34 | 27 | 25 | 24 |
| Tack Free Time, sec | 36 | 30 | 47 | 36 | 36 | 34 |
| E.R. | 37 | 34 | 48 | 38 | 38 | 34 |
| Density, lb/ft$^3$ | 1.72 | 1.64 | 1.62 | 1.64 | 1.61 | 1.57 |
| R-Value (Initial) | 6.4 | 6.6 | 6.4 | 6.7 | 6.0 | 6.5 |
| R-Value after heat-aged at 70° C. for six weeks | 5.8 | 6.0 | 5.6 | 5.9 | 5.5 | 6.0 |

Example 13(a-d): Absence of Surfactant

Several additional specimens, prepared according to the methods described above and in the presence as well as absence of a surfactant component, are tested for reactivity, density and R-Value measures. Table XI below represents a summary of test data. Polyol "A", as described in Example 2, is used, and a side-by-side comparative data is developed using Terate® HT 5500 polyol. It will be seen that the foam products prepared using polyol "A" exhibited higher initial R-values than the products prepared using Terate® HT 5500 polyol. It will also be seen that the surfactant absence surprisingly produced foam products having acceptable reactivity, density and R-Value properties. Examples 13(a) and 13(b) further gives a side-by-side comparative data between Polyol "A", as described in Example 2, and Terate® HT 5500 polyol.

In the examples of Table XI, the blowing agent can be a hydrocarbon having 3 to 7 carbon atoms, such as butane, n-pentane, i-pentane, cyclopentane, hexane, cyclohexane, each of their alkene analogues, and a combination thereof. A 75/25 iso-/n-pentane is used in these examples. In cases where surfactant is used, it can be silicone based surfactants, such as, commercially available L5162 surfactant or similar. Catalysts may include isocyanate trimerization catalysts of types Polycat®, Dabco®, along with commercial amine catalysts used in the foam industry.

TABLE XI

| Specimen ID | 13(a) | 13(b) | 13(c) | 13(d) |
|---|---|---|---|---|
| Polyol used | Terate ® HT 5500 | Polyol "A" | Terate ® HT 5500 | Polyol "A" |
| weight units | | | | |
| Polyol | 85.0 | | 85.0 | |
| TCPP | 15.0 | | 15.0 | |
| Catalysts | 4.0 | | 4.0 | |
| Surfactant | — | | 0.35 | |
| water | 0.8 | | 0.8 | |
| Blowing Agent | 20.0 | | 20.0 | |
| Isocyanate Index | 3.00 | | 3.00 | |
| Density, lb/ft³ | 1.82 | 1.82 | 1.85 | 1.86 |
| Reactivity Profile | | | | |
| Cream Time, sec | 8 | 9 | 9 | 9 |
| Gel Time, sec | 25 | 26 | 29 | 27 |
| Tack Free Time, sec | 43 | 48 | 51 | 53 |
| E.R. | 37 | 42 | 49 | 40 |
| Initial R-Value | 5.41 | 6.39 | 5.62 | 6.49 |

While the illustrative embodiments of the disclosure have been described with particularity, it will be understood that various other modifications will be apparent to and may be readily made by those skilled in the art without departing from the spirit and scope of the disclosure. Accordingly, it is not intended that the scope of the claims hereof be limited to the examples and descriptions set forth herein but rather that the claims be construed as encompassing all the features of patentable novelty which reside in the present disclosure, including all features which would be treated as equivalents thereof by those skilled in the art to which the disclosure pertains.

EMBODIMENTS

Embodiment 1

A foam formed by
a. reacting a polyol with an EO/PO block copolymer having a weight average molecular weight from ≥1,000 to ≤20,000 g/mol to form a homogeneous foam precursor composition viscosity in the range of ≥100 to ≤10,000 centipoise, as determined at 25° C. according to the ASTM D-4878 method; and
b. contacting the homogeneous foam precursor of (a) with isocyanate and a halogen-free blowing agent.

Embodiment 2

The foam of embodiment 1, wherein at least one of the following independent conditions is met: (a) the polyol comprises a polyester polyol; (b) the weight average molecular weight of the EO/PO block copolymer is ≥4,000 and ≤10,000 centipoise; and (c) the homogeneous foam precursor composition viscosity is in the range of ≥1000 to ≤5,000 centipoise.

Embodiment 3

The foam of Embodiment 1 or claim 2, wherein the polyol comprises an aromatic polyester polyol.

Embodiment 4

The foam of any one of Embodiments 1 to 3, wherein the reaction between the polyol and the EO/PO block copolymer is carried out in the presence of an esterification catalyst.

Embodiment 5

The foam of any one of Embodiments 1 to 4, wherein the blowing agent is a hydrocarbon.

Embodiment 6

The foam of any one of Embodiments 1 to 5 having a weight per unit volume of at least 1.5 lb/ft3 and an insulation R-value of greater than 6.

Embodiment 7

A homogeneous foam precursor for making foam with a nonhalogenated blowing agent, said homogeneous foam precursor comprising the reaction product of a polyester polyol and an EO/PO block copolymer, wherein the EO/PO block copolymer has a weight average molecular weight from ≥1,000 to ≤20,000 g/mol and the homogeneous foam precursor has a viscosity in the range of ≥100 to ≤10,000 centipoise, as determined at 25° C. according to the ASTM D-4878 method.

Embodiment 8

A foam comprising the reaction product of a mixture of: (a) from 10 to 50 wt. % of the foam precursor of Embodiment 7; (b) from 30 to 80 wt. % organic isocyanate; (c) from 0 to 10 wt. % of hydroxylated component other than aromatic polyester polyol; (d) from 0 to 5 wt. % of catalyst; (e) from 1 to 20 wt. % of a hydrocarbon as blowing agent; and (f) from 0 to 5 wt. % of surfactant.

Embodiment 9

A method for making foam comprising:
(a) reacting a polyester polyol with an EO/PO block copolymer, wherein the EO/PO block copolymer has a weight average molecular weight from ≥1,000 to ≤20,000 g/mol to form a homogeneous foam precursor having a viscosity in the range of ≥100 to ≤10,000 centipoise, as determined at 25° C. according to the ASTM D-4878; and
(b) contacting the homogeneous foam precursor of (a) with isocyanate and non-halogenated blowing agent under foam-forming conditions.

Embodiment 10

The method of Embodiment 9 and further comprising adding catalyst to step (b).

What is claimed is:
1. A foam formed by:
a) reacting an aromatic polyester polyol with an EO/PO block copolymer having a weight average molecular weight from ≥1,000 to ≤20,000 g/mol to form a homogeneous foam precursor composition with a viscosity in a range of ≥100 to ≤10,000 centipoise, as determined at 25° C. according to ASTM D-4878; and
b) contacting the homogeneous foam precursor composition of (a) with an isocyanate and a halogen-free blowing agent.

2. The foam of claim 1, wherein the weight average molecular weight of the EO/PO block copolymer is in a range of ≥4,000 and ≤10,000 g/mol, and the homogeneous foam precursor composition viscosity is in the range of ≥1000 to ≤5,000 centipoise.

3. The foam of claim 1, wherein the reaction between the aromatic polyester polyol and the EO/PO block copolymer is carried out in a presence of an esterification catalyst.

4. The foam of claim 1, wherein the blowing agent is a hydrocarbon.

5. The foam of claim 1 having a weight per unit volume of at least 1.5 lb/ft$^3$ and an insulation R-value of greater than 6.

6. A homogeneous foam precursor for making foam with a nonhalogenated blowing agent, said homogeneous foam precursor comprising a reaction product of a polyester polyol and an EO/PO block copolymer, wherein the EO/PO block copolymer has a weight average molecular weight from ≥1,000 to ≤20,000 g/mol and the homogeneous foam precursor has a viscosity in a range of ≥100 to ≤10,000 centipoise, as determined at 25° C. according to ASTM D-4878.

7. A foam comprising a reaction product of a mixture of:
a) from 10 to 50 wt. % of the homogeneous foam precursor of claim 6;
b) from 30 to 80 wt. % of an organic isocyanate;
c) from 0 to 10 wt. % of a hydroxylated component other than an aromatic polyester polyol;
d) from 0 to 5 wt. % of a catalyst;
e) from 1 to 20 wt. % of a hydrocarbon as a blowing agent; and
f) from 0 to 5 wt. % of a surfactant.

8. A method for making foam comprising:
(a) reacting a polyester polyol with an EO/PO block copolymer, wherein the EO/PO block copolymer has a weight average molecular weight from ≥1,000 to ≤20,000 g/mol to form a homogeneous foam precursor having a viscosity in a range of ≥100 to ≤10,000 centipoise, as determined at 25° C. according to ASTM D-4878; and
(b) contacting the homogeneous foam precursor of (a) with an isocyanate and a non-halogenated blowing agent under foam-forming conditions.

9. The method of claim 8, further comprising adding a catalyst during contacting the homogeneous foam precursor of step (b).

\* \* \* \* \*